(12) United States Patent
Murata et al.

(10) Patent No.: US 8,016,488 B2
(45) Date of Patent: Sep. 13, 2011

(54) FLUID DYNAMIC BEARING DEVICE

(75) Inventors: Itsuo Murata, Aichi-gun (JP); Masaya Soeda, Aichi-gun (JP); Masaharu Hori, Kuwana (JP); Masaaki Toda, Ama-gun (JP)

(73) Assignee: NTN Corporation, Osaka-shi (JP)

( * ) Notice: Subject to any disclaimer, the term of this patent is extended or adjusted under 35 U.S.C. 154(b) by 31 days.

(21) Appl. No.: 12/411,749

(22) Filed: Mar. 26, 2009

(65) Prior Publication Data

US 2009/0190869 A1 Jul. 30, 2009

Related U.S. Application Data

(63) Continuation of application No. PCT/JP2007/069768, filed on Oct. 10, 2007.

(30) Foreign Application Priority Data

Oct. 27, 2006 (JP) ................... 2006-292981

(51) Int. Cl.
*F16C 17/00* (2006.01)
(52) U.S. Cl. ................... 384/107; 384/111; 384/112
(58) Field of Classification Search .................. 384/107, 384/111, 112, 113, 114, 118, 120
See application file for complete search history.

(56) References Cited

U.S. PATENT DOCUMENTS

| 7,654,742 B2 * | 2/2010 | Nishimoto et al. ........... 384/107 |
| 2003/0169952 A1 | 9/2003 | Yamashita et al. |
| 2007/0286538 A1 | 12/2007 | Mizutani |

FOREIGN PATENT DOCUMENTS

| JP | 11-155254 | * | 6/1999 |
| JP | 11-283321 | * | 10/1999 |
| JP | 2001-41253 | * | 2/2001 |
| JP | 2002-369446 | * | 12/2002 |
| JP | 2003-139129 | * | 5/2003 |
| JP | 2003-239951 A | | 8/2003 |
| JP | 3602707 B2 | | 12/2004 |
| JP | 2005-321089 A | | 11/2005 |

OTHER PUBLICATIONS

International Search Report of PCT/JP2007/069768, Mailing Date of Nov. 27, 2007.
Notification of Transmittal of Translation of the International Preliminary Report on Patentability (Form PCT/IB/338) of International Application No. PCT/JP2007/069768 mailed May 7, 2009 with Forms PCT/IB/373 and PCT/ISA/237.

* cited by examiner

*Primary Examiner* — William C Joyce
(74) *Attorney, Agent, or Firm* — Westerman, Hattori, Daniels & Adrian, LLP

(57) ABSTRACT

The fluid dynamic bearing device includes a housing, two bearing sleeves fixed to the housing at positions axially spaced apart from each other, and a shaft member inserted along inner peripheries of the bearing sleeves. The housing includes a spacer portion protruding further radially inwardly than inner peripheral surfaces to which the bearing sleeves are fixed. An axial fluid path is formed in the spacer portion, and the axial fluid path communicates to flow paths formed by axial grooves of the bearing sleeves.

6 Claims, 4 Drawing Sheets

FLUID DYNAMIC BEARING DEVICE

CROSS-REFERENCE TO RELATED APPLICATION

This is a continuation application of international application PCT/JP2007/069768 filed Oct. 10, 2007, and claiming the priority of Japanese application 2006-292981 filed Oct. 27, 2006.

TECHNICAL FIELD

The present invention relates to a fluid dynamic bearing device.

BACKGROUND ART

A fluid dynamic bearing device supports a shaft member in a non-contact manner with a dynamic pressure effect of fluid formed in a bearing gap. The bearing device of this type has characteristics of high-speed rotation, high rotational accuracy, low noise, and the like, and is recently being suitably used as a bearing device for a motor mounted on various electric equipment such as information equipment, specifically, for a spindle motor of a magnetic disk device including an HDD, or an optical disk device including a CD-ROM, a CD-R/RW, and a DVD-ROM/RAM, and a magneto optical disk device including MD and MO, for a polygon scanner motor of a laser beam printer (LBP), for a color wheel motor of a projector, and for a fan motor.

For example, in a fluid dynamic bearing device incorporated in a spindle motor for a disk drive, such as an HDD, both the radial bearing portion supporting the shaft member in the radial direction and the thrust bearing portion supporting the shaft member in the thrust direction may be formed by fluid dynamic bearings. In a known radial bearing portion in a fluid dynamic bearing device of this type, dynamic pressure grooves as a dynamic pressure generating portion are formed, for example, either in the inner peripheral surface of a bearing sleeve or in the outer peripheral surface of a shaft member opposed thereto, and a radial bearing gap is formed between the two surfaces (see, for example, Patent Document 1).

By the way, in information equipment which incorporates the fluid dynamic bearing device having the above-mentioned structure, for example, a disk drive such as an HDD, further high-speed rotating is required for the purpose of a further increase in speed of reading. In this case, a moment load that acts on a bearing portion supporting a spindle shaft in a freely rotating manner. Thus, in order to deal with an increase in moment load, it is necessary to provide radial bearing portions at multiple points so as to be axially spaced apart from each other, and to increase a span between the radial bearing portions. Further, while there has been adopted conventional structure in which the multiple radial bearing portions are provided on an inner periphery side of one bearing sleeve, downsizing of motor and a reduction in diameters of a spindle shaft and a bearing sleeve involved therewith are required, and hence, in some cases, it is difficult to manufacture a bearing sleeve capable of dealing with an increase in the span between the radial bearing portions.

As means for increasing a span between radial bearing portions and facilitating manufacture of a bearing sleeve, it is considered that multiple bearing sleeves are arranged at multiple points so as to be axially spaced apart from each other (see, for example, Patent Document 2). However, in a fluid dynamic bearing device disclosed in Patent Document 2, it is necessary to arrange a spacer member between the bearing sleeves arranged so as to be axially spaced apart from each other, and hence there arises a problem in that a number of components and an assembly man-hour are increased.

Patent Document 1: JP 2003-239951 A
Patent Document 2: JP 3602707 B

DISCLOSURE OF THE INVENTION

Problems to be Solved by the Invention

An object of the present invention is to provide a fluid dynamic bearing device in which moment load capacity is high, a bearing sleeve can be easily manufactured, and a number of components and an assembly man-hour are reduced.

Means for Solving the Problems

In order to attain the above-mentioned object, the present invention provides a fluid dynamic bearing device, including: a housing; bearing sleeves accommodated in the housing; a shaft member inserted along inner peripheries of the bearing sleeves; and radial bearing portions supporting the shaft member in a non-contact manner in a radial direction by a dynamic pressure action of a lubricant fluid, which is generated in radial bearing gaps between inner peripheral surfaces of the bearing sleeves and an outer peripheral surface of the shaft member, in which the multiple bearing sleeves are arranged so as to be axially spaced apart from each other, and in which a spacer portion, which protrudes further radially inwardly than outer peripheral surfaces of the bearing sleeves, is provided between the bearing sleeves axially spaced apart from each other, the spacer portion being formed integrally with the housing.

According to the above-mentioned structure, multiple bearing sleeves are arranged at multiple points so as to be axially spaced apart from each other, and hence a span between radial bearing portions is increased, whereby it is possible to enhance the moment load capacity and to facilitate manufacture of the bearing sleeves. Further, the spacer portion, which is provided between the bearing sleeves spaced apart from each other, is formed integrally with the housing, and hence a number of components and an assembly man-hour can be reduced when compared to a case in which a separate spacer member is arranged.

In the above-mentioned structure, the spacer portion can be provided with a fluid path opened to both sides in an axial direction thereof. In addition, the fluid path of the spacer portion can communicate to axial fluid paths provided between inner peripheral surfaces of the housing and the outer peripheral surfaces of the bearing sleeves. Those fluid paths constitute circulating paths for allowing lubricant fluid to flow and circulate inside the housing. The lubricant fluid flows and circulates through the circulating paths. As a result, the pressure balance of the lubricant fluid filled in the internal space of the housing including the bearing gaps can be maintained, and at the same time, generation of air bubbles involved in local generation of negative pressure, leakage and vibration of the lubricant fluid caused by the generation of air bubbles, and the like can be solved. By causing a part of the circulating paths to face the outside air opened side, even when air bubbles mix in the lubricant fluid for some reason, the air bubbles are discharged to the outside air opened side when circulating with the lubricant fluid, and hence adverse effects by the air bubbles can be more effectively prevented.

In the above-mentioned structure, the shaft member may have protruding sections protruding to an outer diameter side thereof, and thrust bearing portions may be provided between end surfaces of the protruding sections and end surfaces of the bearing sleeves, the thrust bearing portions supporting the shaft member in a non-contact manner in a thrust direction by the dynamic pressure action of the lubricant fluid generated in thrust bearing gaps. The protruding sections may be formed integrally with the shaft member, or may be fixed to the shaft member. Further, the dynamic pressure generating means (dynamic pressure groove, etc.) of the thrust bearing portions may be formed on one of the end surfaces of the protruding sections and the end surfaces of the bearing sleeves.

Further, seal spaces may be formed on outer periphery sides of the protruding sections of the shaft member. The seal spaces have a so-called buffer function of absorbing the change in volume (expansion and shrinkage) caused by the change in temperature of the lubricant fluid filled in the internal space of the housing.

In the above-mentioned structure, the housing can be a product made by die molding of a molten material. The material of the housing may be any one of a resin and metal. When the housing is made of a resin, for example, the injection molding of a thermoplastic resin, etc. can be adopted. Further, when the housing is made of metal, for example, the die-cast molding and the injection molding (so-called MIM method, thixo-molding method) of aluminum alloy, magnesium alloy, stainless steel alloy, etc. can be adopted.

The fluid dynamic bearing device of the present invention is suitable for a motor incorporated particularly in a disk drive such as an HDD for a server.

Effects of the Invention

According to the present invention, it is possible to provide a fluid dynamic bearing device in which moment load capacity is high, a bearing sleeve can be easily produced, and a number of components and an assembly man-hour are reduced.

BEST MODE FOR CARRYING OUT THE INVENTION

In the following, embodiments of the present invention are described with reference to the drawings.

FIG. 1 illustrates a fluid dynamic bearing device 1 according to a first embodiment of the present invention. The fluid dynamic bearing device 1 supports rotation of a disk hub in a motor incorporated in an HDD, particularly, in an HDD for a server. The fluid dynamic bearing device 1 is formed of a housing 2, multiple (for example, two) bearing sleeves 3 and 4 fixed to the housing 2 at positions axially spaced apart from each other, and a shaft member 5 inserted along inner peripheries of the bearing sleeves 3 and 4 as main components.

As described later, there are provided a first radial bearing portion R1 between an inner peripheral surface 3a of the bearing sleeve 3 and an outer peripheral surface 5a of the shaft member 5, and a second radial bearing portion R2 between an inner peripheral surface 4a of the bearing sleeve 4 and the outer peripheral surface 5a of the shaft member 5. In addition, in this embodiment, there are provided a first thrust bearing portion T1 between an upper end surface 3b of the bearing sleeve 3 and a lower end surface 6b of a seal member 6, and a second thrust bearing portion T2 between a lower end surface 4b of the bearing sleeve 4 and an upper end surface 7b of a seal member 7. Note that, for the sake of convenience in description, a side (upper side of drawings) on which an end portion of the shaft member 5 protrudes from the housing 2 is referred to as the upper side, and a side opposite thereto is referred to as the lower side.

The housing 2 is integrally formed, for example, by injection molding of a resin material, and includes inner peripheral surfaces 2a and 2b to which the bearing sleeves 3 and 4 are fixed, respectively, a spacer portion 2c protruding further radially inwardly than the inner peripheral surfaces 2a and 2b. In accordance with arrangement positions of the bearing sleeves 3 and 4, the inner peripheral surfaces 2a and 2b are positioned so as to be axially spaced apart from each other, and a region between the inner peripheral surfaces 2a and 2b constitutes the spacer portion 2c. Note that, the inner peripheral surfaces 2a and 2b have the same diameter. Further, in this embodiment, the spacer portion 2c is provided with an axial fluid path 2c1, and the fluid path 2c1 is opened to an upper end surface 2c2 and a lower end surface 2c3. Multiple (for example, three) fluid paths 2c1 are formed, and are arranged equiangularly. In addition, large diameter portions 2d and 2e are provided to both end portions of the housing 2, and communicate to the inner peripheral surfaces 2a and 2b, respectively, through an intermediation of step surfaces 2f and 2g.

The fluid path 2c1 of the spacer portion 2c may be formed by effecting pore processing after molding of the housing 2. However, for the purpose of a reduction in processing man-hour and a reduction in manufacturing cost involved therewith, it is desirable to form the fluid path 2c1 simultaneously with molding of the housing 2. This can be performed by providing a molding pin, which corresponds to a shape of the fluid path 2c1, to a molding die for molding the housing 2. Further, a cross-sectional shape of the fluid path 2c1 is not limited to a circular one, and a non-circular (elliptic, polygonal, etc.) shape may be adopted. In addition, a cross-sectional area of the fluid path 2c1 is not necessary to be axially uniform, and, for example, the fluid path 2c1 may have a relatively large part and a relatively small part of the cross-sectional area.

A resin forming the housing 2 is mainly made of a thermoplastic resin; for example, it is possible to use an amorphous resin, such as polysulfone (PSF), polyether sulfone (PES), polyphenyl sulfone (PPSF), or polyether imide (PEI), or a crystalline resin, such as liquid crystal polymer (LCP), polyether ether ketone (PEEK), polybutyrene terephthalate (PBT), or polyphenylene sulfide (PPS). There are no particular limitations regarding the filler to be used for the above resin; for example, it is possible to use, as the filler, a fibrous filler, such as glass fiber, a whisker-like filler, such as potassium titanate, a scale-like filler, such as mica, or a fibrous or powdered conductive filler, such as carbon fiber, carbon black, graphite, carbon nanomaterial, or metal powder. These fillers may be used singly or in the form of a mixture of two or more them. This embodiment employs, as the material forming the housing 2, a resin material obtained by mixing 2 to 8 wt % of carbon fiber or carbon nanotube as the conductive filler with liquid crystal polymer (LCP) as the crystalline resin.

The shaft member 5 is made of a metal material such as stainless steel, and has a shaft shape of substantially the same diameter in general. In addition, in this embodiment, the annular seal members 6 and 7 are fixed to the shaft member 5 by an appropriate fixing means such as adhesion or press-fit adhesion (simultaneous use of press-fitting and adhesion). The seal members 6 and 7 are protruded to an outer diameter side from the outer peripheral surface 5a of the shaft member 5, and are accommodated in the large diameter portion 2b, 2c of the housing 2, respectively. In order to enhance the fixing strength of adhesive, circumferential grooves 5a1 and 5a2 acting as adhesive pool are provided on the outer peripheral surface 5a of the shaft member 5 that constitutes the fixing positions of the seal members 6 and 7. The seal members 6 and 7 may be made of a soft metal material such as brass or other metal materials, or may be made of a resin material. Further, any one of the seal members 6 and 7 may be integrally formed with the shaft member 5. In this case, an assembly including the shaft member 5 and one of the seal members can be formed of a complex of metal and a resin. As an example of the complex, there is considered one in which the shaft member 5 is made of metal and one of the seal members is formed by insert molding of a resin.

The outer peripheral surface 6a of the seal member 6 forms a seal space S1 of a predetermined volume between itself and the large diameter portion 2d of the housing 2, and the outer peripheral surface 7a of the seal member 7 forms a seal space S2 of a predetermined volume between itself and the large diameter portion 2e of the housing 2. In this embodiment, the outer peripheral surface 6a of the seal member 6 and the outer peripheral surface 7a of the seal member 7 are respectively formed into a tapered surface shape in which diameter thereof gradually narrows towards the exterior side of the housing 2. Thus, the seal spaces S1 and S2 have a tapered shape gradually narrowing towards the interior side of the housing 2.

The bearing sleeves 3 and 4 are formed into, for example, a cylindrical shape with a porous body made of a sintered metal, in particular, with a porous body of a sintered metal having copper as main component. The bearing sleeves 3 and 4 are fixed to the inner peripheral surfaces 2a and 2b, respectively, of the housing 2 through press-fitting, bonding, press-fit bonding, or the like. Note that, the bearing sleeves 3 and 4 are made of a metal material such as a copper alloy other than a sintered metal.

As illustrated in FIG. 2, in the bearing sleeve 3, dynamic pressure grooves 3a1 having a herringbone shape are formed on the inner peripheral surface 3a constituting a radial bearing surface of the first radial bearing portion R1, dynamic pressure grooves 3b1 having a herringbone shape are formed on the upper end surface 3b constituting a thrust bearing surface of the first thrust bearing portion T1, and further axial grooves 3d1 are formed on an outer peripheral surface 3d. Multiple (for example, three) axial grooves 3d1 are formed, and are arranged equiangularly. By the axial grooves 3d1, axial fluid paths are formed between the inner peripheral surface 2a of the housing 2 and the axial grooves 3d1. Similarly, in the bearing sleeve 4, dynamic pressure grooves 4a1 having a herringbone shape are formed on the inner peripheral surface 4a constituting a radial bearing surface of the second radial bearing portion R2, dynamic pressure grooves 4b1 having a herringbone shape are formed on the lower end surface 4b constituting a thrust bearing surface of the second thrust bearing portion T2, and further, axial grooves 4d1 are formed on an outer peripheral surface 4d. Multiple (for example, three) axial grooves 4d1 are formed, and are arranged equiangularly. By the axial grooves 4d1, axial fluid paths are formed between the inner peripheral surface 2b of the housing 2 and the axial grooves 4d1. Note that, though not shown, one or multiple radial grooves can be formed on a lower end surface 3c of the bearing sleeve 3. Both ends of the radial groove are opened toward the inner peripheral surface 3a and the outer peripheral surface 3d of the bearing sleeve 3, respectively. Similarly, radial grooves also can be formed on an upper end surface 4c of the bearing sleeve.

For example, the fluid dynamic bearing device 1 can be assembled in the following processes.

First, the bearing sleeves 3 and 4 are fixed on the inner peripheral surfaces 2a and 2b, respectively, of the housing 2 in the manner as illustrated in FIG. 2.

Further, as enlargedly illustrated in FIG. 3, the bearing sleeve 3 is fixed to the inner peripheral surface 2a after adjusting the axial position thereof such that the upper end surface 3b of the bearing sleeve 3 is flush with the step surface 2f on the upper side of the housing 2 or that the upper end surface 3b of the bearing sleeve 3 protrudes from the step surface 2f by a slight dimension δ2. As illustrated in the drawing, in a case in which the upper end surface 3b of the bearing sleeve 3 protrudes from the step surface 2f by the dimension δ2, the axial dimension between the lower end surface 6b of the seal member 6 and the step surface 2f is larger than a thrust bearing gap δ1 of the first thrust bearing portion T1. Further, though not shown, the bearing sleeve 4 is also fixed to the inner peripheral surface 2b of the housing 2 after performing the same positional adjustment as that of the bearing sleeve 3.

The bearing sleeves 3 and 4 are fixed to the inner peripheral surfaces 2a and 2b, respectively, of the housing 2 after adjusting the axial positions thereof in the above-mentioned manner, with the result that, as illustrated in FIGS. 1 and 2, a slight gap is generated in some cases between the lower end surface 3c of the bearing sleeve 3 and the upper end surface 2c2 of the spacer portion 2c and between the upper end surface 4c of the bearing sleeve 4 and the lower end surface 2c3 of the spacer portion 2c. Owing to the gap, the fluid paths 2c1 of the spacer portion 2c communicate to the axial grooves 3d1 of the bearing sleeve 3 and the axial grooves 4d1 of the bearing sleeve 4, and both upper and lower ends of the fluid paths 2c1 communicate to a gap between an inner peripheral surface 2c4 of the spacer portion 2c and the outer peripheral surface 5a of the shaft member 5. Note that, owing to the axial dimensions of the bearing sleeves 3 and 4, and the inner peripheral surfaces 2a and 2b, the gap may be generated only on the side of one of the bearing sleeves 3 and 4. Alternatively, both the bearing sleeves 3 and 4 may be brought into contact with the spacer portion 2c. As described above, even when any one of the bearing sleeves 3 and 4 is brought into contact with the spacer portion 2c, the above-mentioned communicating state is secured by an outer periphery chamfer provided on the end surface of the bearing sleeve and the radial groove. For example, in the case in which the bearing sleeve 3 is brought into contact with the spacer portion 2c, the fluid paths 2c1 and the axial grooves 3d1 communicate to each other through the intermediation of the outer periphery chamfer of the lower end surface 3c of the bearing sleeve 3, and the upper ends of the fluid paths 2c1 communicate to the gap between the inner peripheral surface 2c4 of the spacer portion 2c and the outer peripheral surface 5a of the shaft member 5 through the intermediation of the radial grooves provided on the lower end surface 3c of the bearing sleeve 3.

Next, the shaft member 5 is inserted along the inner peripheral surfaces 3a and 4a of the bearing sleeves 3 and 4 and the inner peripheral surface 2c4 of the spacer portion 2c, and the seal members 6 and 7 are fixed at predetermined positions of the shaft member 5. Note that, one of the seal members 6 and 7 may be fixed to the shaft member 5 in advance before insertion, or may be formed integrally with the shaft member 5.

After the assembly is completed through the above-mentioned processes, lubricating oil, for example, is filled as lubricant fluid to an internal space of the housing 2 sealed with the seal members 6 and 7 including an internal air hole (internal air hole of porous body) of the bearing sleeves 4 and 5. The lubricating oil can be filled by immersing the assembly-completed fluid dynamic bearing device 1 in the lubricating oil in a vacuum bath and then being opened to atmospheric pressure.

In the rotation of the shaft member 5, each of the inner peripheral surface 3a of the bearing sleeve 3 and the inner peripheral surface 4a of the bearing sleeve 4 face the outer peripheral surface 5a of the shaft member 5 through the intermediation of a radial bearing gap. A gap between the inner peripheral surface 2c4 of the spacer portion 2c and the outer peripheral surface 5a of the shaft member 5 is larger than the radial bearing gap. The upper end surface 3b of the bearing sleeve 3 faces the lower end surface 6b of the seal member 6 through the intermediation of a thrust bearing gap, and the lower end surface 4b of the bearing sleeve 4 faces the upper end surface 7b of the seal member 7 through the intermediation of thrust bearing gap. Then, in accordance with the rotation of the shaft member 5, the dynamic pressure of the lubricating oil is generated in the radial bearing gap, and the shaft member 5 is rotatably supported in a non-contact manner in a radial direction by an oil film of the lubricating oil formed in the radial bearing gap. As a result, there are formed the first radial bearing portion R1 and the second radial bearing portion R2 that rotatably support the shaft member 5 in a non-contact manner in the radial direction. At the same time, the dynamic pressure of the lubricating oil is generated in the thrust bearing gap, and the seal members 6 and 7 fixed by the shaft member 5 are rotatably supported in a non-contact manner in a thrust direction by an oil film of the lubricating oil formed in the thrust bearing gap. As a result, there are formed the first thrust bearing portion T1 and the second thrust bearing portion T2 that rotatably support the shaft member 5 in a non-contact manner in the thrust direction.

Further, as described above, seal spaces S1 and S2 formed on a side of an outer peripheral surface 6a of the seal member 6 and a side of an outer peripheral surface 7a of the seal member 7 have a tapered shape gradually narrowing toward the inner side of the housing 2, and hence the lubricating oil in both the seal spaces S1 and S2 is drawn in the direction in which the seal space narrows, that is, toward the inner side of the housing 2 by the drawing action by the capillary force and the drawing action by centrifugal force in rotation. The leakage of the lubricating oil from the interior of the housing 2 is thereby effectively prevented. Further, the seal spaces S1 and S2 have a buffer function of absorbing the amount of change in volume involved in the change in temperature of the lubricating oil filled in the internal space of the housing 2, and the fluid level of the lubricating oil is always within the seal spaces S1 and S2 within a range of the expected temperature change.

Further, a series of circulating paths is formed inside the housing 2 by a fluid path formed by the axial groove 3d1 of the bearing sleeve 3, a fluid path formed by the axial groove 4d1 of the bearing sleeve 4, the fluid path 2c1 of the spacer portion 2c, each bearing gap (radial bearing gap of the first radial bearing portion R1 and the second radial bearing portion R2, thrust bearing gap of the first thrust bearing portion T1 and the second thrust bearing portion T2), and the gap between the inner peripheral surface 2c4 of the spacer portion 2c and the outer peripheral surface 5a of the shaft member 5. As the lubricating oil filled in the internal space of the housing 2 flows and circulates through the circulating paths, the pressure balance of the lubricating oil can be maintained, and at the same time, generation of air bubbles involved in local generation of negative pressure, leakage and vibration of the lubricating oil caused by the generation of air bubbles, and the like are prevented. One end of the fluid path formed by the axial groove 3d1 of the bearing sleeve 3 and one end of the fluid path formed by the axial groove 4d1 of the bearing sleeve 4 communicate to the seal spaces S1 and S2, respectively, which are the atmosphere opened side. Thus, even when air bubbles mix in the lubricating oil for some reason, the air bubbles are discharged to the outside air opened side when circulating with the lubricating oil, and hence adverse affects by the air bubbles can be more effectively prevented.

FIG. 4 illustrates a fluid dynamic bearing device 11 according to a second embodiment of the present invention. The fluid dynamic bearing device 11 is different from the fluid dynamic bearing device 1 according to the first embodiment in the points that respective inner peripheral surfaces 2a and 2b of the housing 2 have an uniform diameter and extend to the end surface of the housing 2, and that the seal members 6 and 7 have a relatively small diameter, with being involved in the former point. When compared to the fluid dynamic bearing device 1 according to the first embodiment, there can be attained the advantage in that the shape of the housing 2 is simplified and the diameter of the housing 2 is reduced. Note that, in this embodiment, the lower end surface 3c of the bearing sleeve 3 and the upper end surface 2c2 of the spacer portion 2c are brought into contact with each other, and the upper end surface 4c of the bearing sleeve 4 and the lower end surface 2c3 of the spacer portion 2c are brought into contact with each other. Other matters are similar to those of the first embodiment, and hence substantially the same members and parts are denoted by the same reference symbols thereof, and redundant description thereof is omitted.

In the above description, the dynamic pressure grooves having a herringbone shape are exemplified as the dynamic pressure generating mechanism for the radial bearing portions R1 and R2 and the thrust bearing portions T1 and T2. However, a dynamic pressure groove having a spiral shape or other shapes may be adopted. Alternatively, as the dynamic pressure generating means, a so-called step bearing or multi-arc bearing may be adopted.

Figure 1:
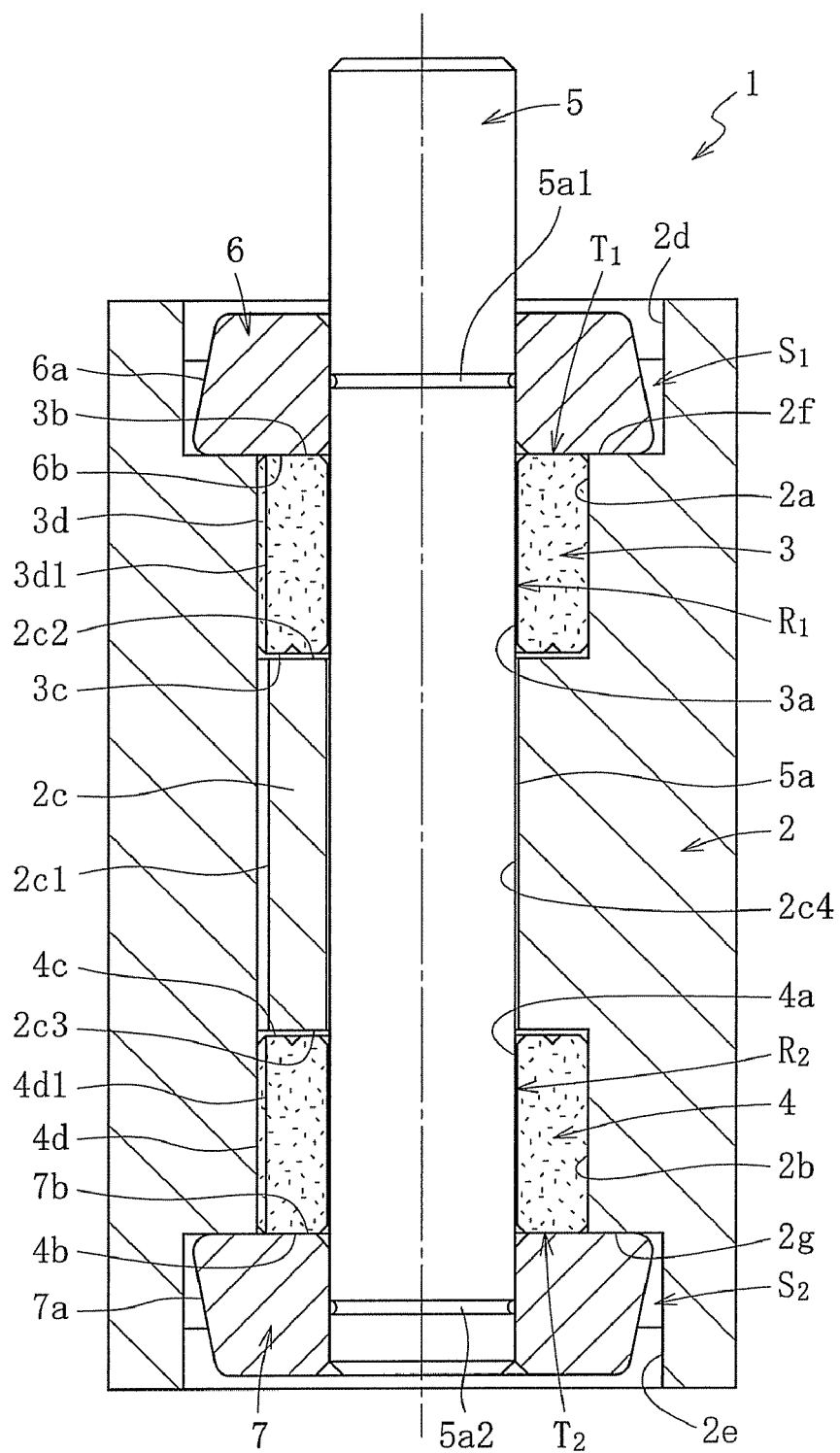
FIG. 1 A sectional view of a fluid dynamic bearing device according to a first embodiment of the present invention.
Figure 2:
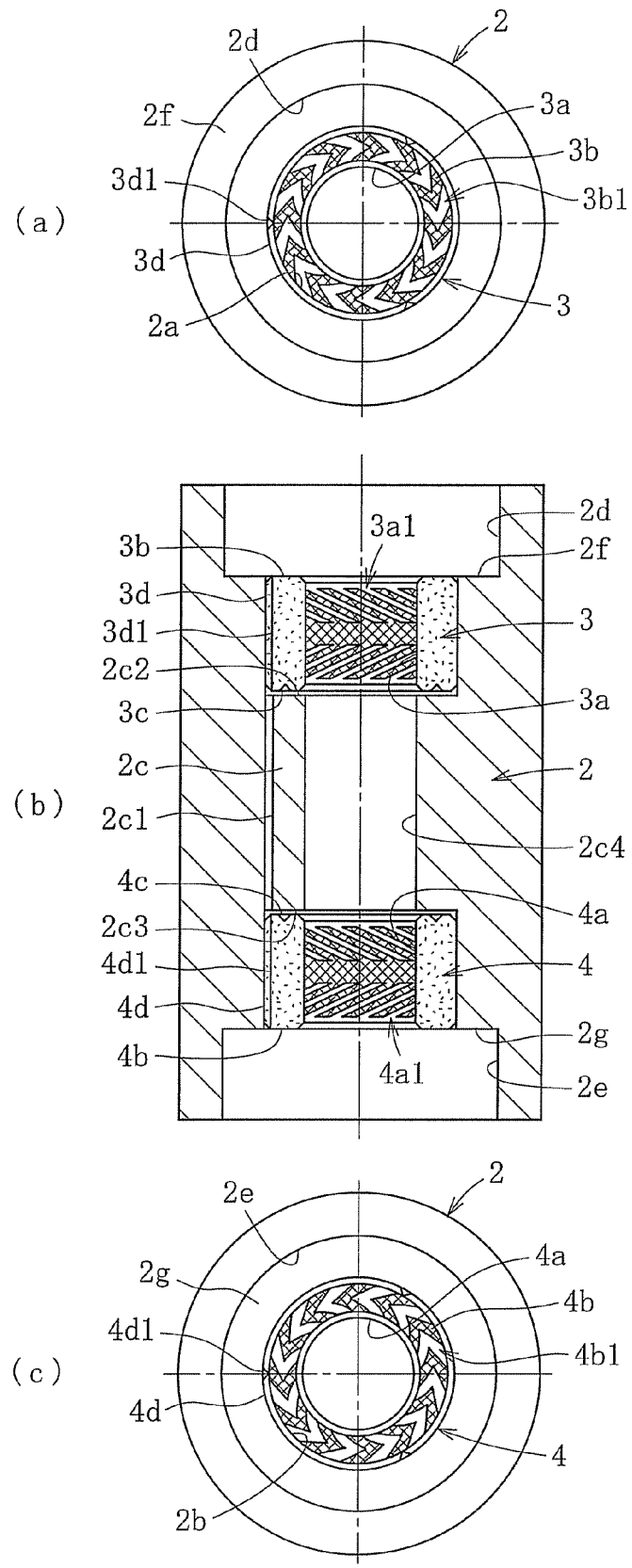
FIG. 2 A top view {FIG. 2(a)}, a sectional view {FIG. 2(b)}, and a bottom view {FIG. 2(a)} illustrating a state in which bearing sleeves are fixed to a housing.
Figure 3:
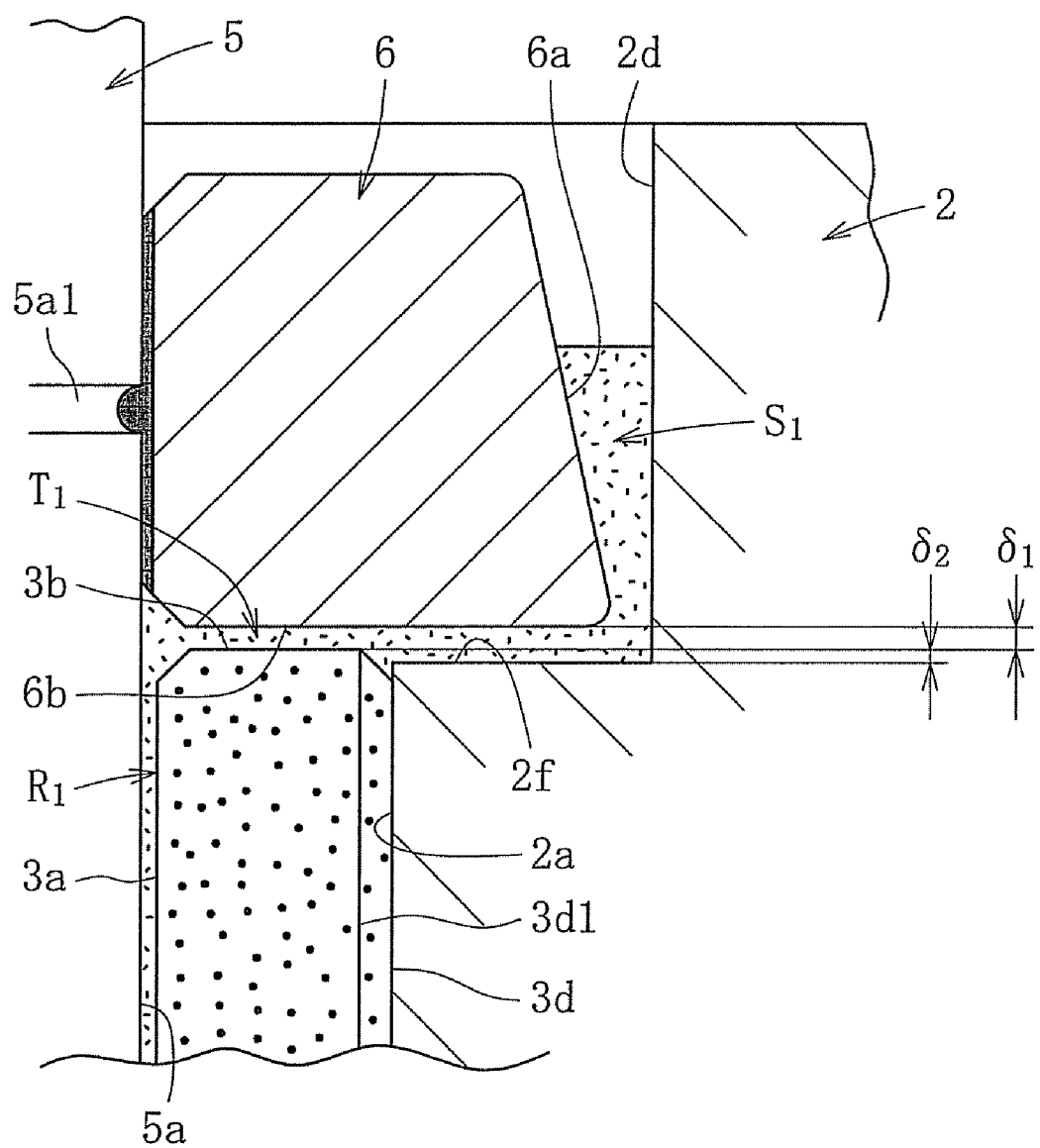
FIG. 3 An enlarged sectional view of an upper portion of the housing.
Figure 4:
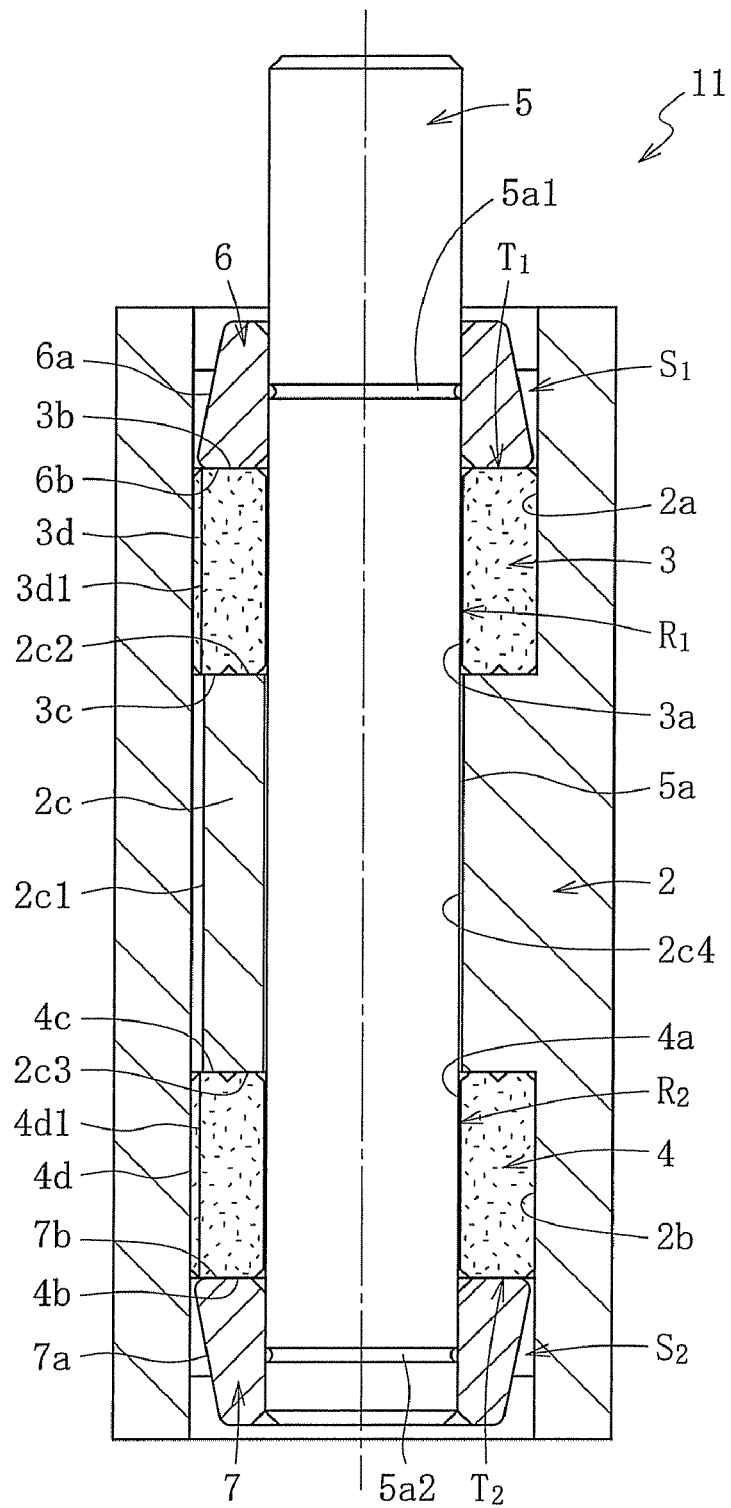
FIG. 4 A sectional view of a fluid dynamic bearing device according to the first embodiment.

DESCRIPTION OF THE SYMBOLS 1 fluid dynamic bearing device
11 fluid dynamic bearing device
2 housing
2c spacer portion
2c1 fluid path
3 bearing sleeve
4 bearing sleeve
5 shaft member
6 seal member
7 seal member
R1 first radial bearing portion
R2 second radial bearing portion
T1 first thrust bearing portion
T2 second thrust bearing portion
S1 seal space
S2 seal space

The invention claimed is:

1. A fluid dynamic bearing device, comprising:
a housing opened at both ends thereof, the housing being provided with large diameter portions at both end portions thereof;
bearing sleeves accommodated in the housing so as to be axially spaced apart from each other;
a shaft member inserted along inner peripheries of the bearing sleeves, the shaft member having protruding sections which are provided at both ends of the shaft member and protrudes to an outer diameter side of the shaft member;
radial bearing portions supporting the shaft member in a non-contact manner in a radial direction by a dynamic pressure action of a lubricant fluid, which is generated in radial bearing gaps between inner peripheral surfaces of the bearing sleeves and an outer peripheral surface of the shaft member;
thrust bearing portions provided between end surfaces of the protruding sections of the shaft member and end surfaces of the bearing sleeves, the thrust bearing portions supporting the shaft member in a non-contact manner in a thrust direction by a dynamic pressure action of the lubricant fluid generated in thrust bearing gaps;
a spacer portion, which protrudes further radially inwardly than outer peripheral surfaces of the bearing sleeves, is provided between the bearing sleeves axially spaced apart from each other, the spacer portion being formed integrally with the housing; and
seal spaces formed on outer periphery sides of the protruding sections of the shaft member,
wherein axial fluid paths are formed between an inner peripheral surface of the housing and the outer peripheral surfaces of the bearing sleeves, and
wherein each of the end surfaces of the bearing sleeves is axially protruded above a step surface of the large diameter portion of the housing by a predetermined dimension, thereby an axial gap portion having an axial dimension, which is larger than the thrust bearing gap, is formed between the end surface of the protruding section of the shaft member and the step surface of the large diameter portion of the housing, the axial gap portion communicating to the axial fluid path and the thrust bearing gap at an inner diameter side of the axial gap portion and to the seal space at an outer diameter side of the axial gap portion.

2. A fluid dynamic bearing device according to claim 1, wherein the spacer portion is provided with a fluid path opened to both sides in an axial direction thereof.

3. A fluid dynamic bearing device according to claim 2, wherein the fluid path of the spacer portion communicates to axial fluid paths.

4. A fluid dynamic bearing device according to claim 3, wherein the housing is formed by die molding of a molten material.

5. A fluid dynamic bearing device according to claim 2, wherein the housing is formed by die molding of a molten material.

6. A fluid dynamic bearing device according to claim 1, wherein the housing is formed by die molding of a molten material.

* * * * *